(12) United States Patent
Kmiecik et al.

(10) Patent No.: US 8,396,255 B2
(45) Date of Patent: Mar. 12, 2013

(54) SYSTEM FOR AND METHOD OF PROCESSING LASER SCAN SAMPLES AND DIGITAL PHOTOGRAPHIC IMAGES RELATING TO BUILDING FACADES

(75) Inventors: Marcin Michal Kmiecik, Lodz (PL); Rafal Jan Gliszczynski, Lodz (PL)

(73) Assignee: Tomtom Global Content B.V., Amsterdam (NL)

( * ) Notice: Subject to any disclaimer, the term of this patent is extended or adjusted under 35 U.S.C. 154(b) by 741 days.

(21) Appl. No.: 12/311,461

(22) PCT Filed: Oct. 20, 2006

(86) PCT No.: PCT/NL2006/050265
§ 371 (c)(1),
(2), (4) Date: Nov. 30, 2009

(87) PCT Pub. No.: WO2008/044914
PCT Pub. Date: Apr. 17, 2008

(65) Prior Publication Data
US 2010/0104141 A1    Apr. 29, 2010

(30) Foreign Application Priority Data
Oct. 13, 2006    (WO) ................ PCT/NL2006/050259

(51) Int. Cl.
*G06K 9/00* (2006.01)
(52) U.S. Cl. ....................................................... 382/108
(58) Field of Classification Search .......... 382/100–108; 348/420–424, 440–447, 581–588
See application file for complete search history.

(56) References Cited

U.S. PATENT DOCUMENTS

| | | |
|---|---|---|
| 2006/0152522 A1 | 7/2006 | Strassenburg-Kleciak et al. |
| 2006/0188143 A1 | 8/2006 | Strassenburg-Kleciak et al. |
| 2008/0111815 A1* | 5/2008 | Graves et al. ................. 345/420 |

FOREIGN PATENT DOCUMENTS

| | | |
|---|---|---|
| JP | 2005251035 A | 9/2005 |
| JP | 2005532631 A | 10/2005 |
| WO | WO 2007/045272 | 4/2007 |

OTHER PUBLICATIONS

XP005225768—Madhavan et al: "A computer vision based approach for 3D building modelling of airborne laser scanner DSM data" Computers Environment and Urban Systems, New York, NY, US, vol. 30 No. 1, Jan. 2006.

* cited by examiner

*Primary Examiner* — Atiba O Fitzpatrick

(57) ABSTRACT

A computer arrangement is disclosed, including a processor that can communicate with a memory. The memory stores a computer program that can be run by the processor, and stores a set of laser scan samples including a sub-set of laser scan samples relating to a façade of a building and stores location data as to each laser scan sample. The memory also stores a picture of the same façade including location data as to pixels of the picture. The picture includes data as to a wall of the façade and data as to texture elements in the wall. In at least one embodiment, the processor automatically identifies the wall and the texture elements in the picture while using the laser scan samples.

9 Claims, 9 Drawing Sheets

*Fig 7a* *Fig 7b* *Fig 7c*
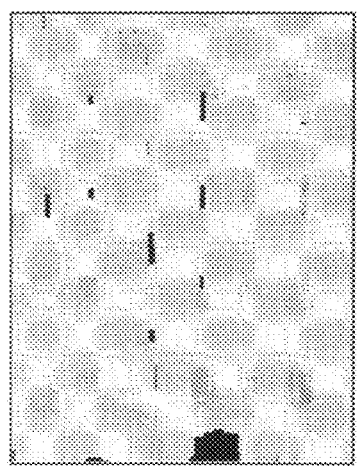 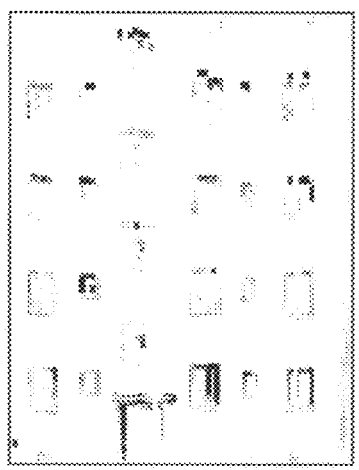 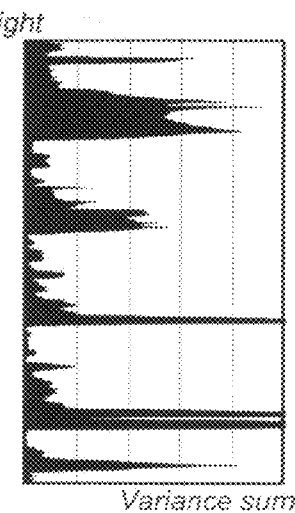
*Fig 8*
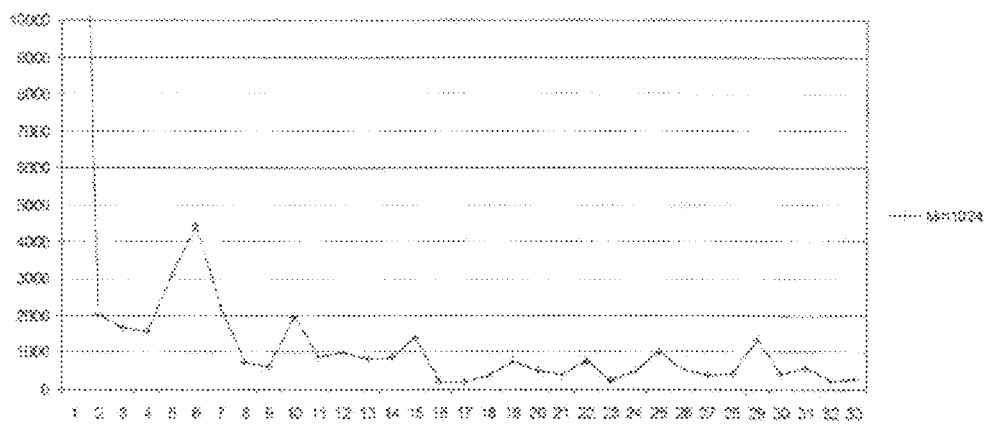

Filtering out depths near to mode value rectangulation

*Fig 11a*
*Fig 11b*
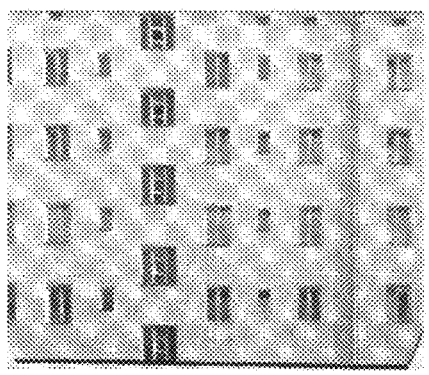  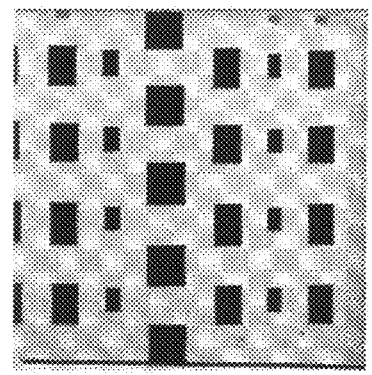
*Fig 12*
*Fig 13*
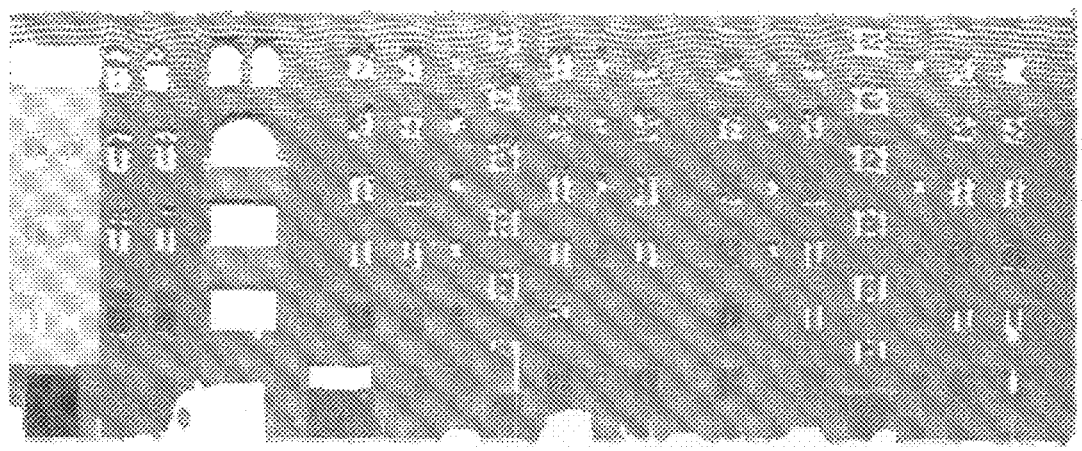

SYSTEM FOR AND METHOD OF PROCESSING LASER SCAN SAMPLES AND DIGITAL PHOTOGRAPHIC IMAGES RELATING TO BUILDING FACADES

FIELD OF THE INVENTION

The present invention relates to a system for and method of processing laser scan samples comprising laser scan samples relating to building façades. one field of application is the detection of building façade texture elements from mobile mapping system data that includes images from cameras and output data from laser scanners.

PRIOR ART

Systems for detection of texture elements from data obtained by a mobile mapping system (MMS) is known for some years. Such a MMS is provided with one or more cameras that take pictures of the environment as controlled by a processor on board the MMS. A MMS may take the form of a car that is driven along roads of interest while the processor controls the camera(s) to take pictures of building façades. In an off-line process, nowadays, the locations of texture elements, like windows and doors, in the façade pictures are identified. The texture elements as present in these façade pictures are then substituted by standard texture elements as stored in a library that is accessible by the processor. Since these standard texture elements are used to construct the façades, the memory space required to store façades with their texture elements is much less than is necessary for storing all the original pictures with their original textures. Further reference is made to unpublished PCT/EP2005/055317.

To build a textured 3D façade model, a good method for identification of such texture elements in the raw picture of the façade is required. In the prior art, there exist methods to analyze and decompose texture from pictures. However, there is a rather high chance that incorrect objects are identified as being texture elements, such as trees, cars, people, and other obstacles in front of a façade. Also like all highly advanced image based technologies, the methods require heavy computational power. Moreover, the prior art process requires a lot of human interaction to obtain good quality for the textural representation of the façade. The speed of manual extraction may be only 1 km/h, on average, which, in total, would bring a cost of thousands of man hours for an average sized city.

SUMMARY OF THE INVENTION

It is an object of the invention to provide a system and method to detect a texture element in a façade as well as its location that requires much less man power than in the prior art.

To that effect, the present invention provides a system as defined in claim 1.

The system according to the invention provides the user with more automatic detection of texture elements in façades than was possible in the prior art. Thus, an enormous amount of labour in the sense of manpower as well as money can be saved. And a realistic building façade can be constructed from these texture elements, for example in a 3D model of the buildings along a street.

In an embodiment, the invention relates to a method as defined in the independent method claim.

In a further embodiment, the invention relates to a computer program product comprising instructions and data arranged to instruct a processor to perform such a method.

Moreover, the invention relates to a data carrier comprising such a computer program product.

BRIEF DESCRIPTION OF THE DRAWINGS

The invention will be explained in detail with reference to some drawings that are intended to illustrate the invention but not to limit its scope which is defined by the annexed claims and its equivalent embodiments.

In the drawings:

FIGS. 7a, 7b, and 7c, respectively, show the façade of the last example of FIG. 6, a variance over this façade and a vertical histogram over the façade of the building, respectively;

FIG. 8 shows the output of a FFT performed on the data shown in FIG. 7c;

FIGS. 11a and 11b show how façade wall data is derived with the aid a mask;

FIG. 12 shows texture elements of façades as derived with the aid of a mask shown in FIG. 10d;

FIG. 13 shows a picture of a façade with upper and lower floors;

DESCRIPTION OF PREFERRED EMBODIMENTS

Figure 1:
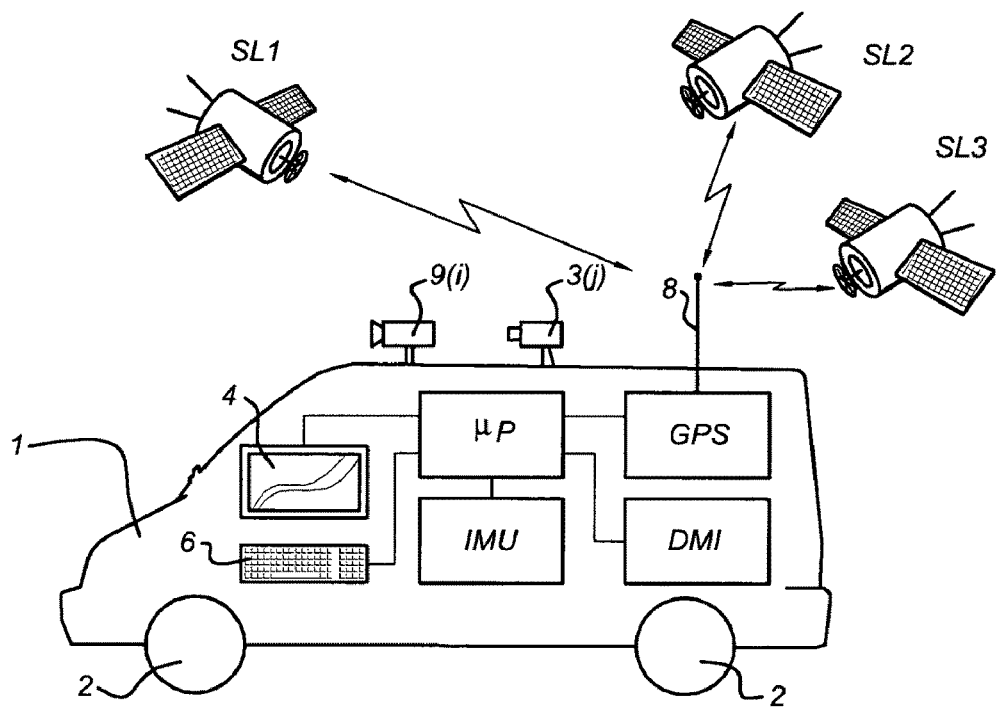
FIG. 1 shows a MMS system with a camera and a laser scanner.

FIG. 1 shows a MMS system that takes the form of a car 1. The car 1 is provided with one or more cameras 9(i), i=1, 2, 3, ... I, and one or more laser scanners 3(j), j=1, 2, 3, ... J. The car 1 can be driven by a driver along roads of interest.

The car 1 is provided with a plurality of wheels 2. Moreover, the car 1 is provided with a high accuracy position determination device. As shown in FIG. 1, the position determination device comprises the following components:

a GPS (global positioning system) unit connected to an antenna 8 and arranged to communicate with a plurality of satellites SLi (i=1, 2, 3, ...) and to calculate a position signal from signals received from the satellites SLi. The GPS unit is connected to a microprocessor µP. Based on the signals received from the GPS unit, the microprocessor µP may determine suitable display signals to be displayed on a monitor 4 in the car 1, informing the driver where the car is located and possibly in what direction it is travelling.

a DMI (Distance Measurement Instrument). This instrument is an odometer that measures a distance traveled by the car 1 by sensing the number of rotations of one or more of the wheels 2. The DMI is also connected to the microprocessor μP to allow the microprocessor μP to take the distance as measured by the DMI into account while calculating the display signal from the output signal from the GPS unit.

an IMU (Inertial Measurement Unit). Such an IMU can be implemented as 3 gyro units arranged to measure rotational accelerations and translational accelerations along 3 orthogonal directions. The IMU is also connected to the microprocessor μP to allow the microprocessor μP to take the measurements by the DMI into account while calculating the display signal from the output signal from the GPS unit.

The system as shown in FIG. 1 is a so-called "mobile mapping system" which collect geographic data, for instance by taking pictures with one or more camera(s) 9(i) mounted on the car 1. The camera(s) are connected to the microprocessor μP. Moreover, the laser scanner(s) 3(j) take laser samples while the car 1 is driven along building blocks of interest. They are also connected to the μP and send these laser samples to the μP.

It is a general desire to provide as accurate as possible location and orientation measurement from the 3 measurement units: GPS, IMU and DMI. These location and orientation data are measured while the camera(s) 9(i) take pictures and the laser scanner(s) 3(j) take laser samples. Both the pictures and the laser samples are stored for later use in a suitable memory of the μP in association with corresponding location and orientation data of the car 1 at the time these pictures and laser samples were taken.

The pictures and laser samples include information as to building block façades. In an embodiment, the laser scanner(s) 3(j) are arranged to produce an output with minimal 50 Hz and 1 deg resolution in order to produce a dense enough output for the method. A laser scanner such as MODEL LMS291-S05 produced by SICK is capable of producing such output.

Figure 2:
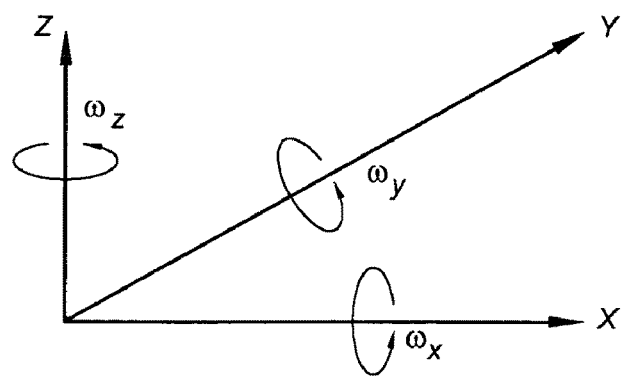
FIG. 2 shows a diagram of location and orientation parameters.

FIG. 2 shows which position signals can be obtained from the three measurement units GPS, DMI and IMU shown in FIG. 1. FIG. 2 shows that the microprocessor μP is arranged to calculate 6 different parameters, i.e., 3 distance parameters x, y, z relative to an origin in a predetermined coordinate system and 3 angle parameters $\omega_x$, $\omega_y$, and $\omega_z$, respectively, which denote a rotation about the x-axis, y-axis and z-axis respectively. The z-direction coincides with the direction of the gravity vector.

The microprocessor in the car 1 and memory 9 may be implemented as a computer arrangement. An example of such a computer arrangement is shown in FIG. 3.

Figure 3:
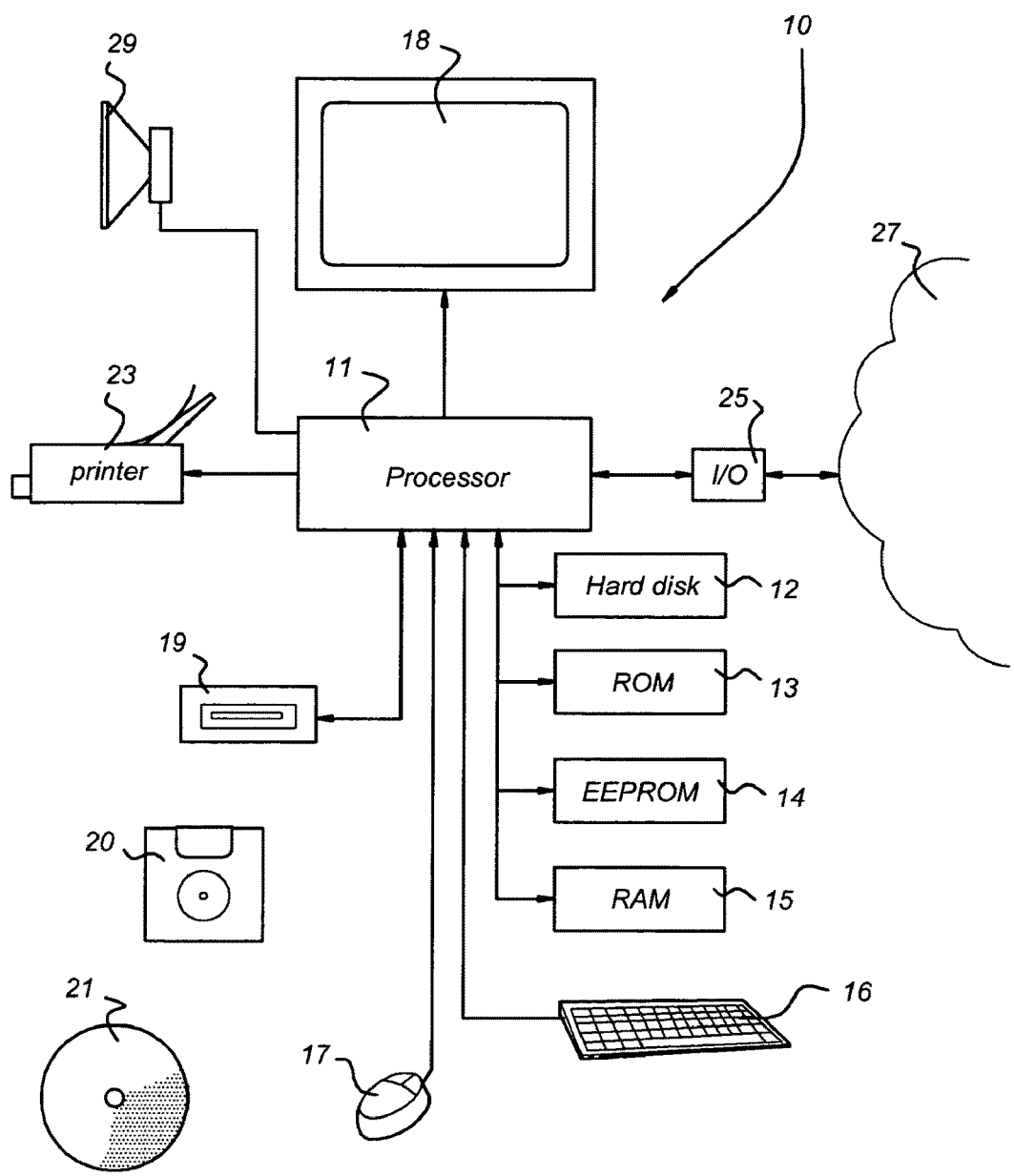
FIG. 3 shows a diagram of a computer arrangement with which the invention can be performed.

In FIG. 3, an overview is given of a computer arrangement 10 comprising a processor 11 for carrying out arithmetic operations. In the embodiment shown in FIG. 2, the processor 11 would be the microprocessor 7.

The processor 11 is connected to a plurality of memory components, including a hard disk 12, Read Only Memory (ROM) 13, Electrically Erasable Programmable Read Only Memory (EEPROM) 14, and Random Access Memory (RAM) 15. Not all of these memory types need necessarily be provided. Moreover, these memory components need not be located physically close to the processor 11 but may be located remote from the processor 11.

The processor 11 is also connected to means for inputting instructions, data etc. by a user, like a keyboard 16, and a mouse 17. Other input means, such as a touch screen, a track ball and/or a voice converter, known to persons skilled in the art may be provided too.

A reading unit 19 connected to the processor 11 is provided. The reading unit 19 is arranged to read data from and possibly write data on a data carrier like a floppy disk 20 or a CDROM 21. Other data carriers may be tapes, DVD, CD-R. DVD-R, memory sticks etc. as is known to persons skilled in the art.

The processor 11 is also connected to a printer 23 for printing output data on paper, as well as to a display 18, for instance, a monitor or LCD (Liquid Crystal Display) screen, or any other type of display known to persons skilled in the art.

The processor 11 may be connected to a loudspeaker 29.

The processor 11 may be connected to a communication network 27, for instance, the Public Switched Telephone Network (PSTN), a Local Area Network (LAN), a Wide Area Network (WAN), the Internet etc. by means of I/O means 25. The processor 11 may be arranged to communicate with other communication arrangements through the network 27.

The data carrier 20, 21 may comprise a computer program product in the form of data and instructions arranged to provide the processor with the capacity to perform a method in accordance with the invention. However, such computer program product may, alternatively, be downloaded via the telecommunication network 27.

The processor 11 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 11 through the network 27.

It is observed that when applied in the car 1 the computer arrangement does not need to have all components shown in FIG. 3. For instance, the computer arrangement does not need to have a loudspeaker and printer then. As for the implementation in the car 1, the computer arrangement needs at least processor 11, some memory to store a suitable program and some kind of interface to receive instructions and data from an operator and to show output data to the operator.

For post-processing the pictures and scans as taken by the camera(s) 9(i) and the laser scanner(s) 3(j) a similar arrangement as the one shown in FIG. 3 will be used, be it that that one will not be located in the car 1 but may conveniently be located in a building for off-line post-processing. The pictures and scans as taken by camera(s) 9(i) and scanner(s) 3(j) are stored in one of the memories 12-15. That can be done via storing them first on a DVD, memory stick or the like, or transmitting them, possibly wirelessly, from the memory 9.

In the present invention, façade textures are decomposed by using both the pictures taken by the camera(s) 9(i) and the laser scans taken by the laser scanner(s) 3(j). The method uses a unique combination of techniques from both the field of image processing and laser scanning technology.

Figure 4:
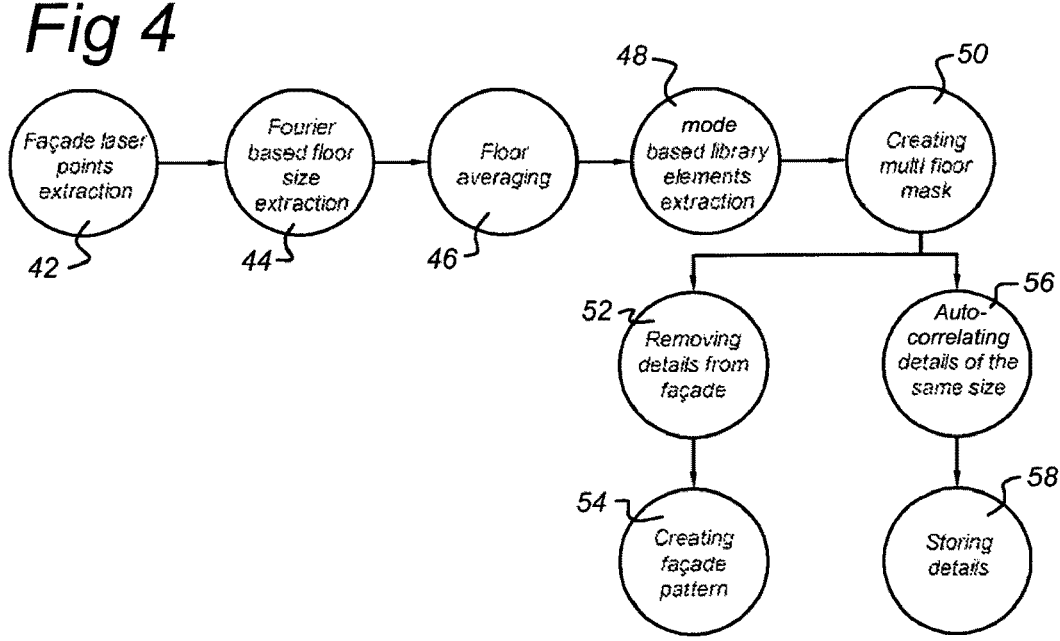
FIG. 4 shows a flow diagram of a method according to the invention.

FIG. 4 shows a flow chart of a method in accordance with the invention.

FIG. 4 shows the following actions:

A. action 42: extraction of façade points in the laser scan (which is the output of the laser scanner)

B. action 44: floor height determination based on Fourier analysis of extracted points in the laser scan C. action 46: floor height averaging D. action 48: extraction of median-based library elements from laser scan
E. action 50: creating a multi floor mask
F. action 52: removing details from a façade picture
G. action 54: creating façade pattern tile
H. action 56: finding duplicate details on the façade picture
I. action 58: dealing with highest and lowest floor elements
J. action 60: storing the details as resulting from actions 54, 56 and 58
K. action 62: minimizing size of library.

These actions will now be explained in detail below.

A. Action 42: Extraction of Façade Points in Laser Scan

Figure 5:
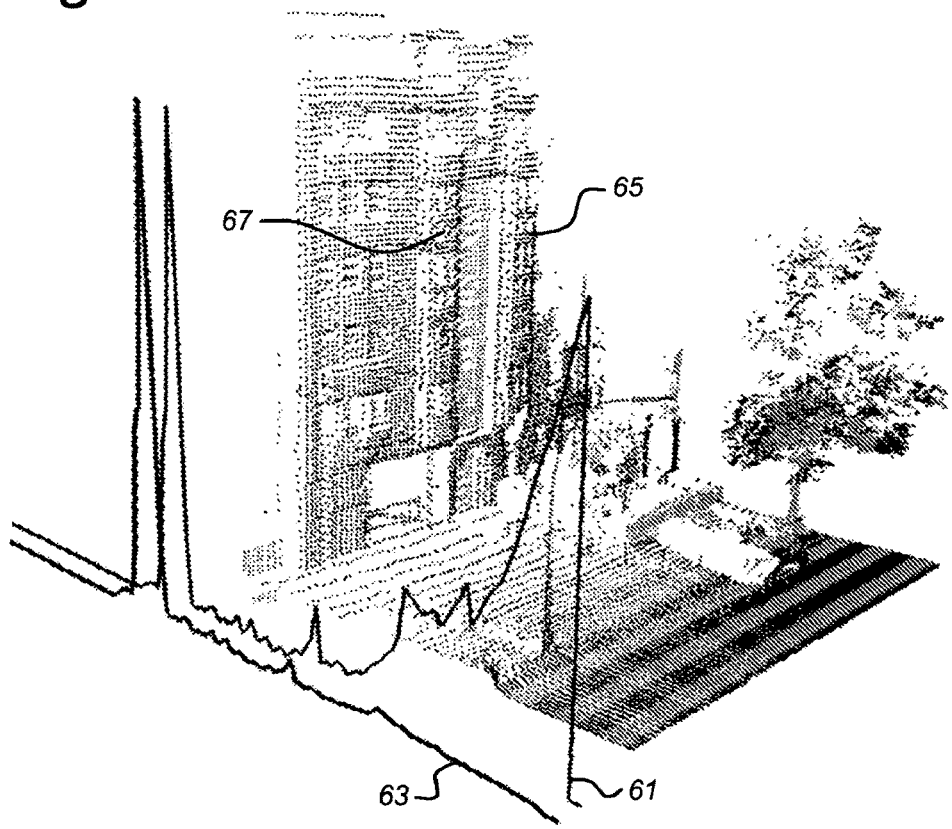
FIG. 5 shows a histogram based on laser scan samples.

The laser scanner(s) 3(*j*) are, in an embodiment 2D laser scanner(s). A 2D laser scanner 3(*j*) provides a triplet of data comprising time of measurement, angle of measurement, and distance to nearest solid object that is visible at this angle from the laser scanner 3(*j*). A good method for finding façade points in the laser scan is to use a histogram analysis. FIG. 5 shows such a histogram. The histogram comprises a number of laser scan samples as taken by the laser scanner(s) 3(*j*) at a certain distance as seen in a direction perpendicular to a trajectory traveled by the MMS system and summed along a certain distance traveled by the car 1. The laser scanner(s) scan in an angular direction over, for instance, 180° in a surface substantially perpendicular to the earth surface (in practice there is a small deviation from the perpendicular plane due to the car 1 moving along the façade). E.g., the laser scanner(s) may take 180 samples each deviating by 1° from its adjacent samples. Most of the time, the MMS system will follow a route along a line that is directed along a certain road (only when changing lanes for some reason the traveled path will show deviations from this). So, in most cases, are the laser scans in a direction perpendicular to the road direction.

In FIG. 5, there are shown two histograms:
1. distance histogram 61—this histogram 61 shows the number of laser scan samples as a function of distance to the car 1 as summed over a certain travel distance, including samples close to the car 1. There is a peak shown close to the car 1 indicating a laser "echo" close to the car 1. This peak relates to many echo's being present close to the car 1 because of the angular sweep made by the laser scanning. Moreover, there is a second peak present at a greater distance which relates to an object identified at that greater distance from the car 1.
2. distance histogram 63 showing only the second peak at a certain distance from the car 1 indicating only one object. This histogram is achieved by eliminating the higher density of laser scan samples in the direct neighbourhood of the car 1 due to the angular distribution of the laser scanning. The effect of this elimination is that one will better see objects at a certain distance away from the car 1, i.e. the façade of a building 65.

The peak on histogram 63 indicates the presence of a flat solid surface parallel to the car heading. The approximate distance between the car 1 and the façade 65 can be determined by any available method. Alternatively, GPS (or other) data indicating the trajectory traveled by the car 1 and data showing locations of footprints of buildings can be compared and, thus, render such approximate distance data between the car 1 and the façade 65. By analysing the histogram data within a certain area about this approximate distance, the local maximal peak within this area is identified as being the base of a façade 65. All laser scan samples that are within a perpendicular distance of, for instance, 0.5 m from this local maximal peak are considered as architectural detail of the façade 65 and marked as "façade points". All other points are considered as "ghosts" and are marked so. It is observed that the distance of 0.5 m is only given as an example. Other distances may be used, if required.

Figure 6:
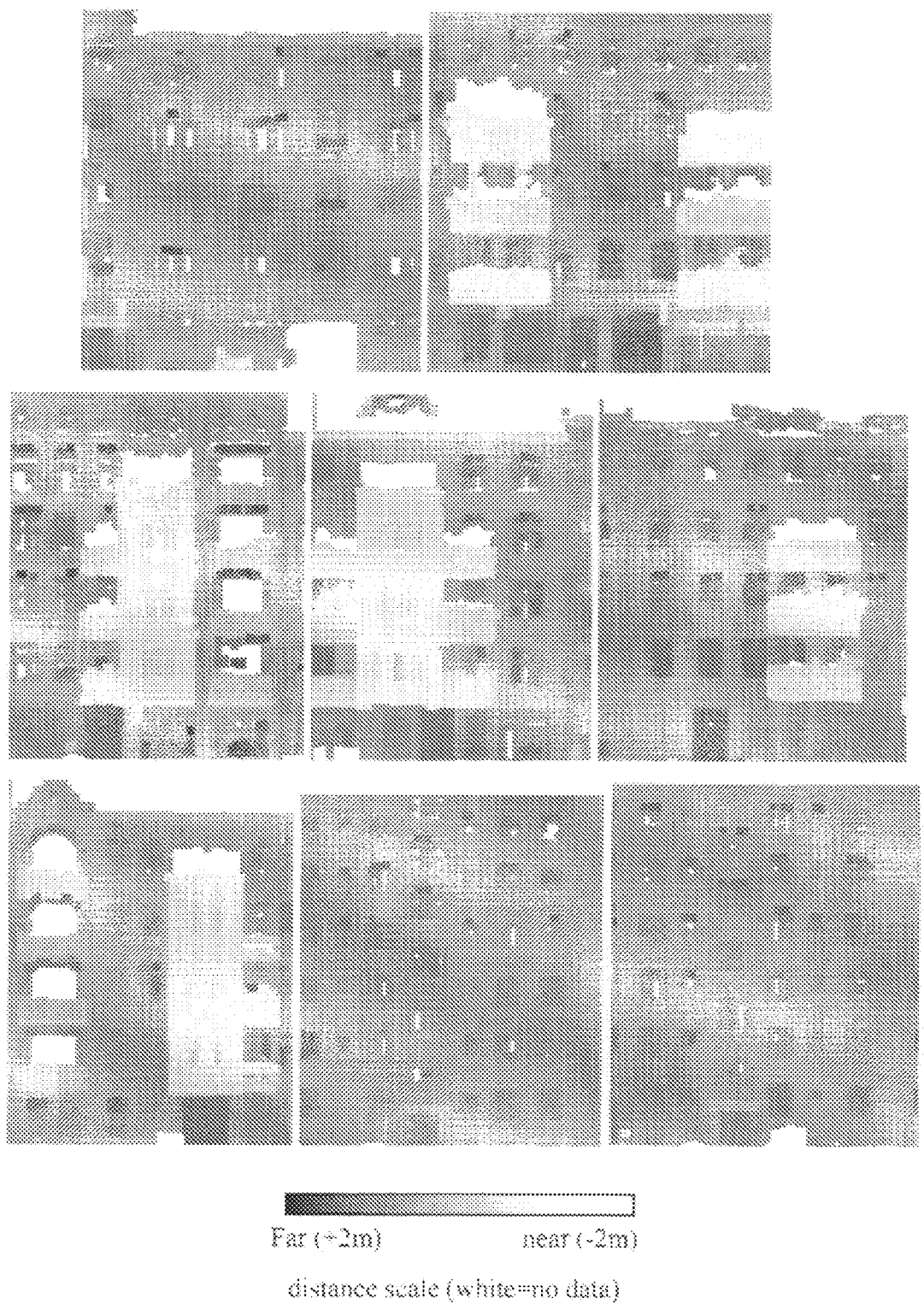
FIG. 6 shows several examples of laser scans of building façades.

From points marked as "façade" a depth map perpendicular to the vehicle direction is created and stored as an image. This depth-map contains all laser scan samples within, for instance, 0.5 m from the local maximal peak. FIG. 6 shows eight examples of such images, associated with eight different building façades. The images of FIG. 6 are presented with different grey scales where a certain grey intensity corresponds to a certain projected horizontal distance to the car 1 as measured to the laser scanner trajectory on the road.

Examples of detected façade textures in FIG. 6 are:
1. Brighter grey color indicates objects that are closer than the façade plane itself, such as balconies.
2. Grey color indicates objects being more distant than the façade plane itself, usually doors or less transparent windows.
3. White color indicates places where depth is not known, because there was no laser sample at the analyzed distance.

Below, the last façade of FIG. 6 is analyzed in detail.

B. Action 44: Floor Height Size Determination Based on Fourier Analysis of Extracted Points of Laser Scan The next action in the process is the computation of the number of floors in a building as well as a height of a single floor.

On the image generated in step 42 a variance filtering is applied with a window size of 3×3. The variance filtering is applied for a plurality of horizontal lines in the entire area of the image. each horizontal line is at a different height above ground. For every horizontal line an average value of such a variance over the complete line is calculated. Such average data is stored in a table in memory. Thus, the table comprises distance variance data averaged for each horizontal line (height) where "distance" refers to a perpendicular distance from the car 1. A Fast Fourier Transform (FFT) is applied to this average variance, height dependent data in the table to find frequency characteristics of the height component of the image. Such transformation allows one to find a repeatable pattern in the average changes over the height of the building. There is a very low, zero frequency representing the constant background of the building's distance to the car. The next lowest frequency peak in the FFT output data will be caused by patterns of windows and other architectural elements outside the plane of the façade itself and therefore will represent the basic floor pattern of the building The highest peak in the FFT output data will correspond to the frequency of appearance of windows and other floor associated architectural elements in the façade. From the FFT output data, a size (height) of a floor can be computed, as will be explained now in greater detail with reference to FIGS. 7*a*, 7*b*, 7*c*, and 8.

FIGS. 7*a*, 7*b*, and 7*c*, respectively, show the façade of the last example of FIG. 6, the results of a variance filter applied over this image and a variance vs height profile over the façade of the building, respectively. I.e., FIG. 7*c* shows a total variance sum for each horizontal line in the picture of FIG. 7*b*. Brightness of the pixel in FIG. 7*b* corresponds to variance value of depth calculated over of 3×3 area surrounding that pixel. Stated in other terms, in FIG. 7*c* one sees a measure of the average distortion in grey scale intensity at a height z above the earth. An FFT is applied to this variance data shown in FIG. 7*c*, treating the vertical building height as the time axis, and variance as the value of the signal. The result of the FFT is shown in FIG. 8.

Thus, FIG. 8, the output of the Fourier Transform, shows a building's vertical harmonical frequency amplitude spectrum i. The vertical axis shows an amplitude whereas the horizontal axis shows the spatial frequency. For this example, there is a peak at spatial frequency 6. That peak represents the dominate spatial frequency of the building which is assumed to be the floor spacing (and hence window pacing etc.). The actual height of the floor is proportional to the inverse of the spatial frequency as determined by parameters of the FFT.

C. Action 46: Floor Size Averaging

Action 44 has rendered the floor size (height). In action 46, the floors are averaged. In order to ease the overall process and make it more accurate, only "middle floors" are taken into account. A "middle floor" is defined as a floor with a minimal and maximal height that occurs more than once in the façade of the building. One can also say, "middle floors" are vertically repeatable in the façade. For instance, the lower floor of most buildings is not a "middle floor": its height is in most cases not within a certain minimal and maximal height as is the case for higher floors (in most buildings the lower floor is higher than other floors). Similarly, the upper floor is, in most cases not a "middle floor" since its height can not be established very well with the method above because there is no floor above the upper floor with windows that can be identified and used.

Figure 9A:
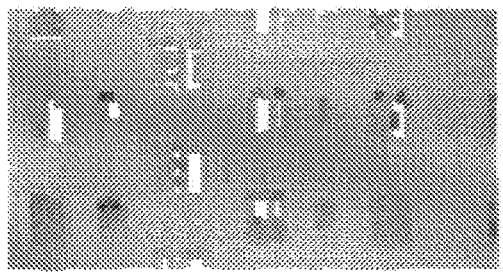
FIGS. 9a and 9b, respectively, show middle floors of a scanned façade and an averaged image of FIG. 9a, respectively.
Figure 9B:

FIGS. 9a and 9b further clarify this. FIG. 9a shows the façade from FIG. 7a after removing of pixels representing the lowest and highest floor (this is done using a size of floor derived from the height of the façade and the number of floors). FIG. 9b shows the same façade after an averaging process.

By averaging all middle floors, as the resolution of the façade data as would be captured by the laser scanner 3(j) may be 3 times higher, for instance may increase from 10 cm to 3 cm resolution in given example). In it's original resolution one pixel on the laser output corresponds to 20 pixels on the image as produced by the cameras. That is why the process of increasing resolution is very important in case when the laser scanner has a lower resolution then the camera (which is typical on currently available equipment). In that manner a higher resolution mask can be obtained, which later on will be applied to the image.

In a test of a large number of buildings in a European city, it was observed that over ninety percent of these buildings had at least two such similar middle floors So, the property of high similarity between two or more floors in a building can be used to virtually increase the laser resolution. This is especially important for higher buildings since laser resolution lowers with building height due to the angular nature of laser measurements. Moreover, averaging allows reconstructing places where trees were in front of part of the façade. This is because trees and other obstacles are filtered out in action 42, and as such these points are not taken into the average. Action 46 delivers a "floor pattern".

D. Action 48: Extraction of Median Based Library Elements from Laser Scan

Figure 10A:
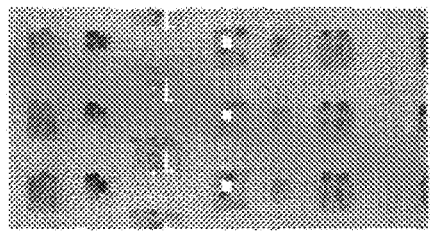
FIGS. 10a-10d show how masks can be derived from the images of FIGS. 9a and 9b.
Figure 10B:
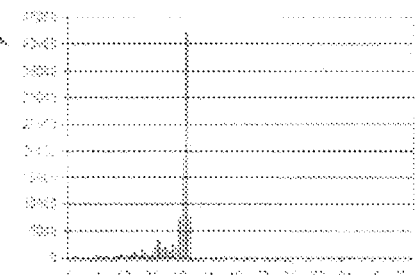
Figure 10C:
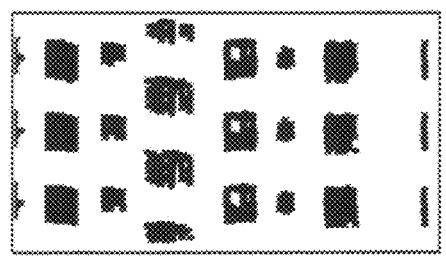
Figure 10D:
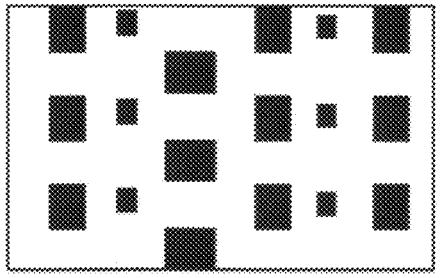
Figure 14:
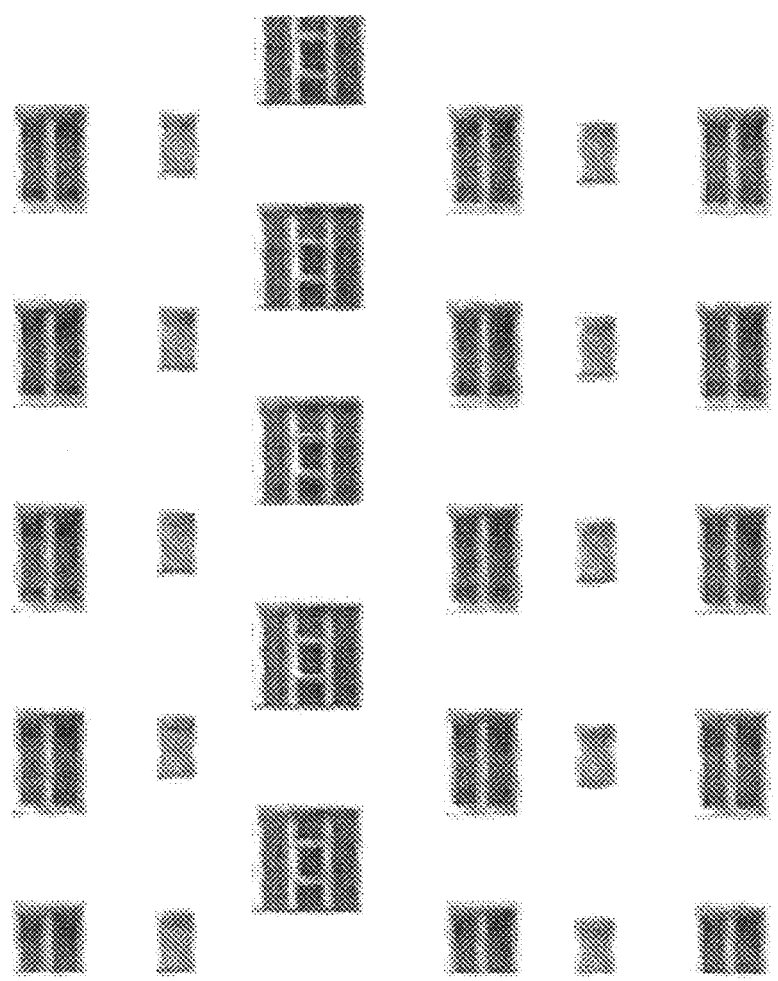
FIG. 14 shows a façade pattern with only average texture elements.
Figure 15A:
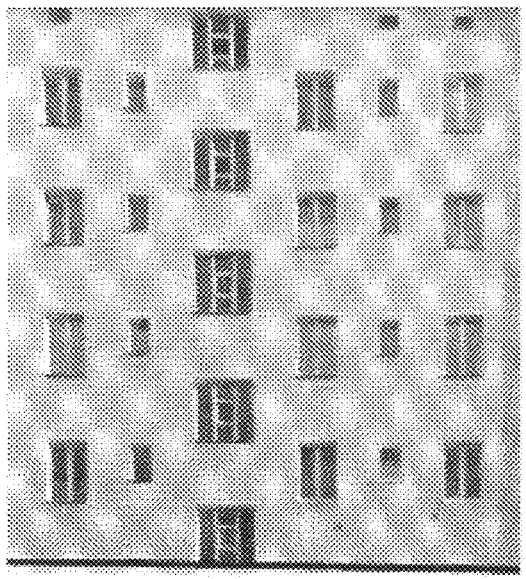
FIGS. 15a, 15b, and 15c, respectively, show an original picture of a façade, a façade picture as resulting from the invention and some stored texture elements, respectively.
Figure 15B:
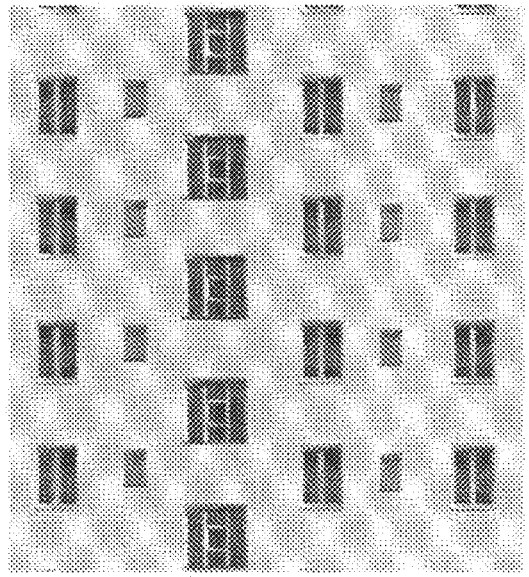
Figure 15C:

FIG. 10a shows the same laser scan as FIG. 9b but replicated to reproduce the three floors. FIG. 10b is a histogram showing the number of laser scanner samples of horizontal projected distances from the laser scanner to the car. It clearly shows one peak which is the most common distance value (also known as the mode value). Those samples which have the mode value are further treated as being associated with the walls of the building and the other samples are treated as being associated with texture elements. Such other samples are mainly associated with windows.

E. Action 50: Creating a Multi Floor Mask

Then, the image is separated into two parts or masks. The first part contains all samples associated with the mode value and is used as a mask indicating the wall of the façade. The second part contains all samples associated with non-mode values and is used as a mask for deriving library elements from the pictures taken by the camera(s) 9(i). Note that both masks contain samples where each sample contains location information.

to a person skilled in the art, such a camera (or cameras) and such a laser scanner (or laser scanners) may alternatively be located on an airborne vehicle. The laser scanner may be part of a LIDAR (Light Detection And Ranging or Laser Imaging Detection And Ranging) system.

It is observed that the method as explained above can be performed by processor 11 as instructed by a suitable software program stored in one of the memories 12-15 or stored elsewhere. The present invention relates to the method and to the computer arrangement with such a processor, but also to a computer program product comprising suitable instructions and data for the described method, as well as a data carrier, like a CD, DVD, etc. comprising such a computer program.

The invention claimed is:

1. Computer arrangement, comprising:
   a memory; and
   a processor, arranged to communicate with the memory, the memory storing a computer program including instructions and data that can be run by the processor, and storing a set of laser scan samples including a sub-set of laser scan samples relating to a facade of a building and storing location data for each of the laser scan samples, said memory also storing a picture of the facade including location data as to pixels of the picture, the picture including data as to a wall of the facade and data as to texture elements in the wall, said stored computer program being executed on said processor arranged to:
   retrieve from memory a plurality of series of consecutive laser samples, each series of laser samples lying in a separate plane substantially perpendicular to the earth, to produce a distance histogram of laser scan samples in each separate plane, and to identify a peak in each of the distance histograms in proximity to where the facade is expected to be located, and to select said sub-set of laser scan samples as being laser scan samples on the peak and to automatically relate the sub-set of laser scan samples to the facade; and
   automatically identify the wall and the texture elements in the picture using the laser scan samples.

2. Computer arrangement according to claim 1, wherein said stored computer program being executed on said processor is arranged to identify floor heights in the facade based on a Fourier analysis on the sub-set of laser scan samples.

3. Computer arrangement according to claim 2, wherein said stored computer program being executed on said processor is arranged to identify middle floors in the facade and to generate an averaged middle floor.

4. Computer arrangement according to claim 1, wherein said stored computer program being executed on said processor is arranged to produce a mask relating to said texture element laser scan samples and to use the mask to remove the data as to the texture elements from the picture of the facade and to store the removed texture elements.

5. Computer arrangement according to claim 4, wherein said stored computer program being executed on said processor is also arranged to create average texture elements, each average texture element being associated with one type of texture element, and to store the average texture element.

6. Computer arrangement according to claim 5, wherein said stored computer program being executed on said processor is arranged to create average texture elements from the data as to texture elements as removed from the picture.

7. Computer arrangement according to claim 1, wherein the set of laser scan samples includes further laser scan samples relating to objects in front of the facade, the further laser scan samples relating to objects closer to a laser scanner than the facade which the laser scanner is used to take the set of laser scan samples while moving along said facade, said stored computer program being executed on said processor being arranged to compensate peaks in said histograms relating to the further laser scan samples.

8. A method of processing laser scan samples and a picture stored in a memory and executed on the processor of a computing device, comprising:

storing a set of laser scan samples including a sub-set of laser scan samples relating to a facade of a building;

storing location data for each of the laser scan samples;

storing a picture of the facade including location data as to pixels of the picture, the picture including data as to a wall of the facade and data as to texture elements in the wall;

retrieving from memory a plurality of series of consecutive laser samples, each series of laser samples lying in a separate plane substantially perpendicular to the earth, to produce a distance histogram of laser scan samples in each separate plane, and to identify a peak in each of the distance histograms in proximity to where the facade is expected to be located, and to select said sub-set of laser scan samples as being laser scan samples on the peak and to automatically relate the sub-set of laser scan samples to the facade; and automatically identify the wall and the texture elements in the picture using the laser scan samples.

9. A non-transitory computer readable medium including program segments for, when executed on a processor of a computer device, causing the computer device to implement the method of claim 8.

\* \* \* \* \*